US012720571B2

(12) United States Patent
Liu et al.

(10) Patent No.: US 12,720,571 B2
(45) Date of Patent: Aug. 25, 2026

(54) TRANSMISISON OF FEEDBACK INFORMATION

(71) Applicant: Nokia Technologies Oy, Espoo (FI)

(72) Inventors: Yong Liu, Shanghai (CN); Tao Tao, Shanghai (CN); Nuno Manuel Kiilerich Pratas, Aalborg (DK); Jianguo Liu, Shanghai (CN); Dong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 18/559,814

(22) PCT Filed: Jun. 1, 2021

(86) PCT No.: PCT/CN2021/097727

§ 371 (c)(1),
(2) Date: Nov. 9, 2023

(87) PCT Pub. No.: WO2022/252122

PCT Pub. Date: Dec. 8, 2022

(65) Prior Publication Data

US 2024/0260058 A1 Aug. 1, 2024

(51) Int. Cl.
*H04W 72/25* (2023.01)
*H04W 72/542* (2023.01)

(52) U.S. Cl.
CPC ......... *H04W 72/25* (2023.01); *H04W 72/542* (2023.01)

(58) Field of Classification Search
CPC .. H04W 72/25; H04W 72/542; H04L 1/1854; H04L 5/0055
See application file for complete search history.

(56) References Cited

U.S. PATENT DOCUMENTS

2020/0205165 A1 6/2020 Huang et al.
2020/0412508 A1 12/2020 Wu et al.
(Continued)

FOREIGN PATENT DOCUMENTS

CN 112398613 A 2/2021
WO 2017/118627 A1 7/2017
WO 2019/042270 A1 3/2019
WO 2020/033088 A1 2/2020
WO 2021/081948 A1 5/2021

OTHER PUBLICATIONS

"5 GHz RLAN; Harmonised Standard covering the essential requirements of article 3.2 of Directive 2014/53/EU", ETSI EN 301 893, V2.1.1, May 2017, pp. 1-122.
(Continued)

*Primary Examiner* — Jung H Park
(74) *Attorney, Agent, or Firm* — Barta Jones, PLLC

(57) ABSTRACT

Embodiments of the present disclosure relate to transmission of sidelink feedback information on unlicensed spectrum. The first device transmits a configuration to a second device and a third device. The configuration indicates a primary resource and at least one backup resource, where the primary resource is to be used by the third device for transmitting feedback information of a sidelink transmission to the second device, the sidelink transmission being transmitted by the second device on an unlicensed resource, and the at least one backup resource is to be used by the third device for transmitting the feedback information of the sidelink transmission without performing a channel assessment.

20 Claims, 10 Drawing Sheets

(56) References Cited

U.S. PATENT DOCUMENTS

| | | | | |
|---|---|---|---|---|
| 2021/0028891 | A1 | 1/2021 | Zhou et al. | |
| 2021/0075552 | A1 | 3/2021 | Huang et al. | |
| 2021/0105126 | A1 | 4/2021 | Yi et al. | |
| 2021/0105661 | A1 | 4/2021 | Baghel et al. | |
| 2023/0156785 | A1 * | 5/2023 | Yao | H04W 76/14 370/329 |
| 2023/0276490 | A1 * | 8/2023 | Wu | H04L 1/1861 370/329 |
| 2024/0039680 | A1 * | 2/2024 | Selvanesan | H04L 5/0055 |

OTHER PUBLICATIONS

"IEEE 802.11", Wikipedia, Retrieved on Nov. 4, 2023, Webpage available at : https://en.wikipedia.org/wiki/IEEE_802.11.

"3rd Generation Partnership Project; Technical Specification Group Radio Access Network; Physical layer procedures for shared spectrum channel access (Release 16)", 3GPP TS 37.213, V16.5.0, Mar. 2021, pp. 1-27.

"3rd Generation Partnership Project; Technical Specification Group Radio Access Network; NR; Physical layer procedures for data (Release 16)", 3GPP TS 38.214, V16.5.0, Mar. 2021, pp. 1-171.

"The 5G evolution 3gpp releases 16-17", 5G Americas, Jan. 2020, 54 pages.

International Search Report and Written Opinion received for corresponding Patent Cooperation Treaty Application No. PCT/CN2021/097727, dated Mar. 7, 2022, 9 pages.

"3rd Generation Partnership Project; Technical Specification Group Radio Access Network; Study on NR-based Access to Unlicensed Spectrum; (Release 16)", 3GPP TR 38.889, V1.1.0, Dec. 2018, pp. 1-119.

* cited by examiner

TRANSMIT, TO A SECOND DEVICE AND A THIRD DEVICE, A CONFIGURATION INDICATING A PRIMARY RESOURCE AND AT LEAST ONE BACKUP RESOURCE

TRANSMISISON OF FEEDBACK INFORMATION

RELATED APPLICATION

This application was originally filed as PCT Application No. PCT/CN2021/097727, filed on Jun. 1, 2021, which is incorporated herein by reference in its entirety.

FIELD

Example embodiments of the present disclosure generally relate to the field of communication techniques and in particular, to devices, methods, apparatuses and computer readable storage medium of transmission of feedback information mechanism.

BACKGROUND

Wireless communication networks are widely deployed and can support various types of service applications for terminal devices. Many communication schemes have been proposed to support the rapidly increasing data traffic. For example, a sidelink (SL) communication scheme has been proposed, where SL channels may be established between terminal devices in the wireless communication network and the terminal devices may exchange signalling and data with each other directly via the established SL channels.

In the scenario that the SL communication is performed in licensed spectrum, the devices transmit SL control information associated with SL data on a physical sidelink control channel (PSCCH), and transmit the SL data on a physical sidelink shared channel (PSSCH) based on the SL control information. Further, in order to ensure the reliability of the SL transmission, it is specified that the physical sidelink feedback channel (PSFCH) is used to carry hybrid automatic repeat request (HARQ) feedback information from the receiving device to the transmitting device.

SUMMARY

In general, example embodiments of the present disclosure provide a solution for the transmission of feedback information. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to transmit, to a second device and a third device, a configuration indicating: a primary resource to be used by the third device for transmitting feedback information of a SL transmission to the second device, the SL transmission being transmitted by the second device on an unlicensed resource, and at least one backup resource to be used by the third device for transmitting the feedback information of the SL transmission without performing a channel assessment.

In a second aspect, there is provided a second device. The second device comprises at least one processor; and at least one memory including computer program code; where the at least one memory and the computer program code are configured to receive, from a first device, a configuration indicating: a primary resource to be used by a third device for transmitting feedback information of a SL transmission to the second device, the SL transmission being transmitted by the second device on an unlicensed resource, and at least one backup resource to be used by the third device for transmitting the feedback information of the SL transmission without performing a channel assessment; transmit the SL transmission to the third device; and receive, from the third device, the feedback information of the SL transmission according to the configuration.

In a third aspect, there is provided a third device. The third device comprises at least one processor; and at least one memory including computer program code; where the at least one memory and the computer program code are configured to receive, from a first device, a configuration indicating: a primary resource to be used by the third device for transmitting feedback information of a SL transmission to the second device, the SL transmission being transmitted by the second device on un unlicensed resource, and at least one backup resource to be used by the third device for transmitting the feedback information of the SL transmission without performing a channel assessment; receive the SL transmission from the second device; and transmit, to the second device, the feedback information of the SL transmission according to the configuration.

In a fourth aspect, there is provided a method. The method comprises transmitting, at a first device and to a second device and a third device, a configuration indicating: a primary resource to be used by the third device for transmitting feedback information of a SL transmission to the second device, the SL transmission being transmitted by the second device on an unlicensed resource, and at least one backup resource to be used by the third device for transmitting the feedback information of the SL transmission without performing a channel assessment.

In a fifth aspect, there is provided a method. The method comprises receiving, at a second device and from a first device, a configuration indicating: a primary resource to be used by a third device for transmitting feedback information of a SL transmission to the second device, the SL transmission being transmitted by the second device on an unlicensed resource, and at least one backup resource to be used by the third device for transmitting the feedback information of the SL transmission without performing a channel assessment. The method further comprises transmitting the SL transmission to the third device. The method also comprises receiving, from the third device, the feedback information of the SL transmission according to the configuration.

In a sixth aspect, there is provided a method. The method comprises receiving, at a third device and from a first device, a configuration indicating: a primary resource to be used by the third device for transmitting feedback information of a SL transmission to the second device, the SL transmission being transmitted by the second device on un unlicensed resource, and at least one backup resource to be used by the third device for transmitting the feedback information of the SL transmission without performing a channel assessment. The method further comprises receiving the SL transmission from the second device. The method also comprises transmitting, to the second device, the feedback information of the SL transmission according to the configuration.

In a seven aspect, there is provided a first apparatus. The first apparatus comprises means for transmitting, to a second apparatus and a third apparatus, a configuration indicating: a primary resource to be used by a third apparatus for transmitting feedback information of a SL transmission to the second apparatus, the SL transmission being transmitted by the second apparatus on an unlicensed resource, and at least one backup resource to be used by the third apparatus for transmitting the feedback information of the SL transmission without performing a channel assessment.

In an eighth aspect, there is provided a second apparatus. The second apparatus comprises means for receiving, from a first apparatus, a configuration indicating: a primary resource to be used by a third apparatus for transmitting feedback information of a SL transmission to the second apparatus, the SL transmission being transmitted by the second apparatus on an unlicensed resource, and at least one backup resource to be used by the third apparatus for transmitting the feedback information of the SL transmission without performing a channel assessment. The second apparatus further comprises means for transmitting the SL transmission to the third apparatus. The second apparatus also comprises means for receiving, from the third apparatus, the feedback information of the SL transmission according to the configuration.

In a ninth aspect, there is provided a third apparatus. The third apparatus comprises means for receiving, from a first apparatus, a configuration indicating: a primary resource to be used by the third apparatus for transmitting feedback information of a SL transmission to the second apparatus, the SL transmission being transmitted by the second apparatus on un unlicensed resource, and at least one backup resource to be used by the third apparatus for transmitting the feedback information of the SL transmission without performing a channel assessment. The third apparatus further comprises means for receiving the SL transmission from the second apparatus. The third apparatus also comprises means for transmitting, to the second apparatus, the feedback information of the SL transmission according to the configuration.

In a tenth aspect, there is provided a computer readable medium. The computer readable medium comprises program instructions for causing an apparatus to perform at least the method according to the fourth aspect.

In an eleventh aspect, there is provided a computer readable medium. The computer readable medium comprises program instructions for causing an apparatus to perform at least the method according to the fifth aspect.

In a twelfth aspect, there is provided a computer readable medium. The computer readable medium comprises program instructions for causing an apparatus to perform at least the method according to the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
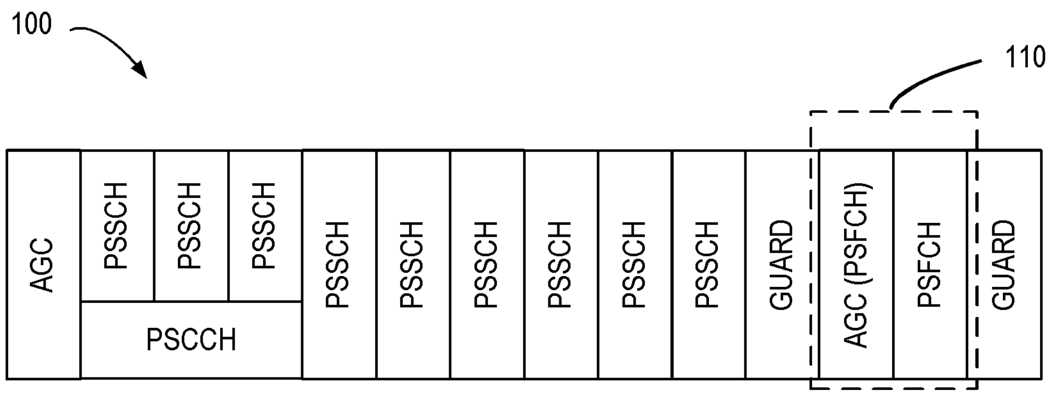
FIG. 1A illustrates an example slot format of SL channel in licensed spectrum.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular fourth device, or other computing or fourth device.

Communications discussed herein may use conform to any suitable standards including, but not limited to, New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a first device and a fourth device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which terminal devices accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground fourth device such as a satellite fourth device, a low earth orbit (LEO) satellite and a geosynchronous earth orbit (GEO) satellite, an aircraft fourth device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a tag with wireless communication capability, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," or "physical resource block" (PRB) may refer to any resource for performing a communication (for example, a communication between a terminal device and a network device, a communication between a terminal device and another terminal device, a network device and another network device), such as a resource in time domain, a resource in frequency domain, a resource in space domain, a resource in code domain, a resource in a combination of more than one domain or any other resource enabling a communication, and the like. In the following, a resource in time domain and frequency domain will be used as examples of a transmission resource for describing some example embodiments of the present disclosure. It is noted that example embodiments of the present disclosure are equally applicable to other resources in other domains.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discusses above, the SL communication scheme has been proposed to support the rapidly increasing data traffic. A work item was conducted in the third Generation Partnership Project (3GPP) for the transmission of feedback information for the SL communication in licensed spectrum. Specifically, in release 16 of 3GPP, it is specified that the PSFCH is used to carry HARQ feedback information from the receiving device to the transmitting device.

In conventional HARQ feedback information solution (for example, transmit PSFCH in licensed spectrum), the HARQ feedback information is represented by a Zadoff-Chu sequence and transmitted on PSFCH in one PRB. The PSFCH carrying the HARQ feedback information is repeated over two orthogonal frequency division multiplexing (OFDM) symbols near the end of the SL resource in a slot. Further, the first of the two OFDM symbols can be used for automatic gain control (AGC).

Reference is now made to FIG. 1A, which illustrates an example slot format 100 of SL channel in licensed spectrum. As shown in FIG. 1A, the PSFCH carrying the HARQ feedback information is repeated over two OFDM symbols 110 (i.e., OFDM symbols #12 and #13). Further, in this conventional solution, the Zadoff-Chu sequence is (pre-) configured per SL resource pool as base sequence.

In addition, the time resources for PSFCH are (pre-) configured to occur once in every 1, 2, or 4 slots. Further, the HARQ feedback resource (i.e., PSFCH) is derived from the resource location of PSCCH/PSSCH carrying the associated SL data. Specifically, for PSSCH-to-HARQ timing, the network device configures a parameter K with the unit of slot. The time occasion for PSFCH is determined from parameter K. Specifically, for a PSSCH transmission with its last symbol in slot n, HARQ feedback is in slot n+a where a is the smallest integer larger than or equal to parameter K with the condition that slot n+a contains PSFCH resources.

Figure 1B:
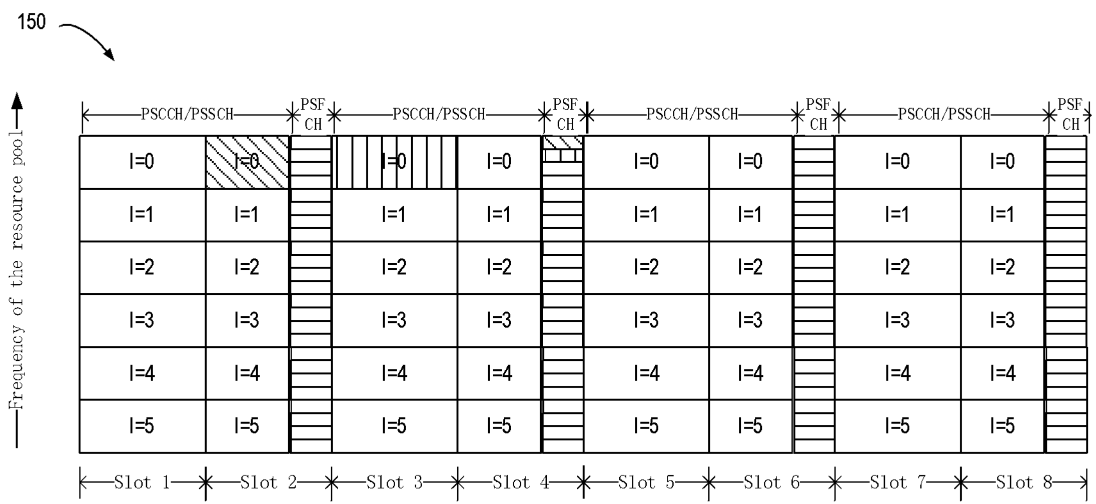
FIG. 1B illustrates example of an example of the resource allocation of PSFCH in licensed spectrum.

The resource allocation of PSFCH will be described with reference to FIG. 1B. As illustrated in FIG. 1B, the resource allocation 150 of PSFCH occurs once in every 2 slots. In the specific example of FIG. 1B, the parameter K is configured to be “1”. For the PSSCH/PSCCH transmitted in slot 2 and 3, the time occasion for the corresponding PSFCH is slot 4.

Further, the PSFCH resources used for HARQ feedback of PSSCH/PSCCH transmissions with the same starting sub-channel in different slots are FDMed. As shown in FIG. 1B, there are six frequency resources (e.g. sub-channels) in the resource pool (i.e., I=0 to I=5) and eight slots (i.e., slot 1 to slot 8). In the example of FIG. 1B, PSFCH resources for PSSCH/PSCCH in slot 2 and PSSCH/PSCCH in slot 3 are FDMed in slot 4.

As discussed above, the above conventional solution of the transmission of feedback information is merely proposed for licensed spectrum and lacks flexibility.

In addition, in the actual communication scenario, there are usually a plurality of different wireless communication systems (such as, a cellular wireless system, a WiFi system and the like) coexisting with each other. Therefore, it is expected that the device can share the unlicensed spectrum (such as, sub-7 GHz unlicensed bands) among the different wireless communication systems. In the conventional solution for unlicensed spectrum, the technology of listen-before-talk (LBT) is used to ensure fair coexistence of the different wireless communication systems. Specifically, if the terminal device want to perform a transmission on the unlicensed spectrum, the terminal device has to determine whether the channel is available by measuring the energy on the channel in a given time window (such as, a number of consecutive Clear Channel Assessment (CCA) slots). The transmission can be performed only if the channel is available/idle.

When implementing the SL communication in unlicensed spectrum, the SL transmission should also be restricted by the LBT result, which means that if the receiving device wants to transmit the PSFCH transmission to the transmitting device, the receiving device has to perform LBT first. However, the result of LBT is uncertain. If the receiving device is unable to perform the PSFCH transmission due to a failure LBT, the transmitting device will not obtain the feedback information about whether the transmission is successful, which may cause an unnecessary re-transmission. However, such re-transmission is undesirable, because a PSSCH/PSCCH transmission occupies multiple PRBs (typically more than 10 PRBs) and most OFDM symbols of a slot, while a PSFCH only occupies one PRB and 2 OFDM symbols of a slot. Therefore, from a resource saving perspective ensuring the reliable transmission of PSFCH is critical.

So far, it has not proposed an efficient solution for supporting SL transmission, especially the transmission of feedback information, in unlicensed spectrum.

According to example embodiments of the present disclosure, there is proposed a solution for transmission of feedback information (such as, ACK/NACK information) in unlicensed spectrum. In this solution, the first device (such as, a network device) transmits a configuration to a second device (such as, a terminal device) and a third device (such as, a further terminal device). The configuration indicates a primary resource and at least one backup resource, wherein the primary resource is to be used by the third device for transmitting feedback information of a SL transmission to the second device, the SL transmission being transmitted by the second device on an unlicensed resource, and the at least one backup resource is to be used by the third device for transmitting the feedback information of the SL transmission without performing a channel assessment.

In this way, since more resources are configured for the transmission of feedback information, it can provide more transmission opportunities for the feedback information. As a result, the reliability of feedback information transmission for SL communication in unlicensed spectrum is increased. In addition, it can eventually increase spectral efficiency by avoiding unnecessary re-transmission of SL transmission (such as, PSCCH/PSSCH), and can also reduce transmission latency in the meantime.

Figure 2:
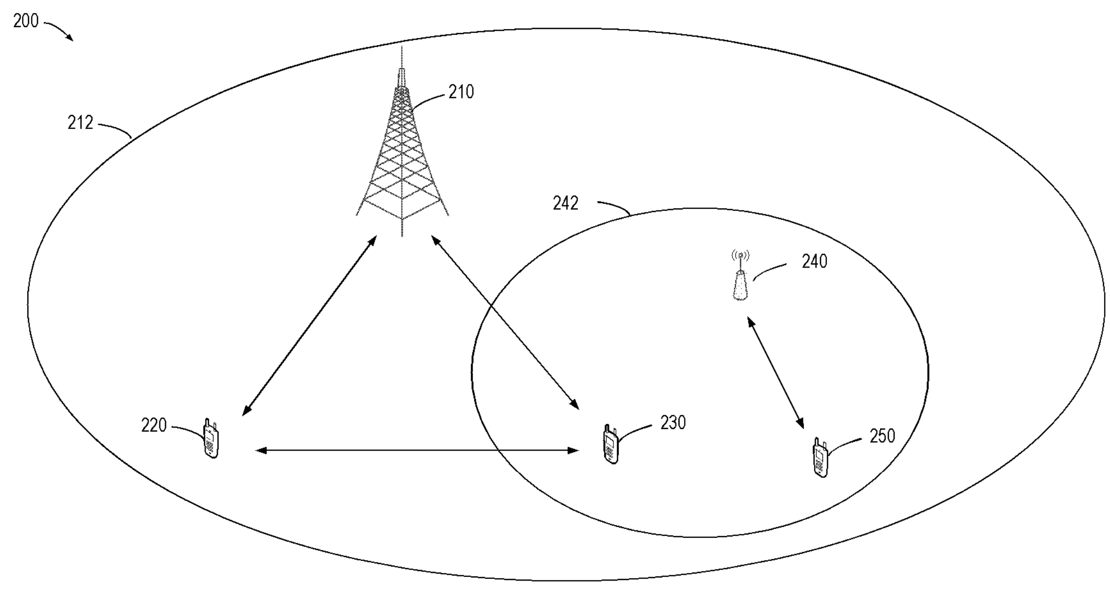
FIG. 2 illustrates an example communication network in which example embodiments of the present disclosure may be implemented.

FIG. 2 shows an example communication network 200 in which example embodiments of the present disclosure can be implemented. The communication network 200 includes a first device 210, a second device 220, a third device 230, a fourth device 240 and a fifth device 250.

In the specific example of FIG. 2, a plurality of different wireless communication systems (such as, a cellular wireless system, a WiFi system and the like) coexist with each other. Specifically, in the specific example of FIG. 2, the first device 210 is illustrated as a network device in a cellular wireless system, and the fourth device 240 is is illustrated as an access point in a WiFi system. The serving area of the first device 210 is referred to as cell 212, and the first device 210 may communicate with the second device 220, the third device 230 and the fifth device 240 (not shown) via physical communication channels or links. Similarly, the serving area of the fourth device 240 is referred to as cell 242, and the fourth device 240 may communicate with the third device 230 (not shown) and the fifth device 250 via physical communication channels or links.

Further, communications on unlicensed resource (such as, unlicensed spectrum) are supported in the communication network 200. In other words, the unlicensed resource may be shared by the different wireless communication systems (i.e., the cellular wireless system and the WiFi system).

In the specific example of FIG. 2, the second device 220, the third device 230 and the fifth device 250 are illustrated as terminal devices. Further, the SL communication is supported in communication network 200. As illustrated in FIG. 2, the second device 220 and the third device 230 may receive control information (such as, resource configuration) from the first device 210 and may communicate with each other directly via an established SL channel.

It is to be understood that the numbers of devices (i.e., the first device 210, the second device 220, the third device 230, the fourth device 240 and the fifth device 250) and their connection relationships and types shown in FIG. 2 are only for the purpose of illustration without suggesting any limitation. The communication network 200 may include any suitable numbers of devices adapted for implementing embodiments of the present disclosure.

Principle and implementations of the present disclosure will be described in detail below with reference to FIGS. 3, 4, 5A and 5B.

Figure 3:
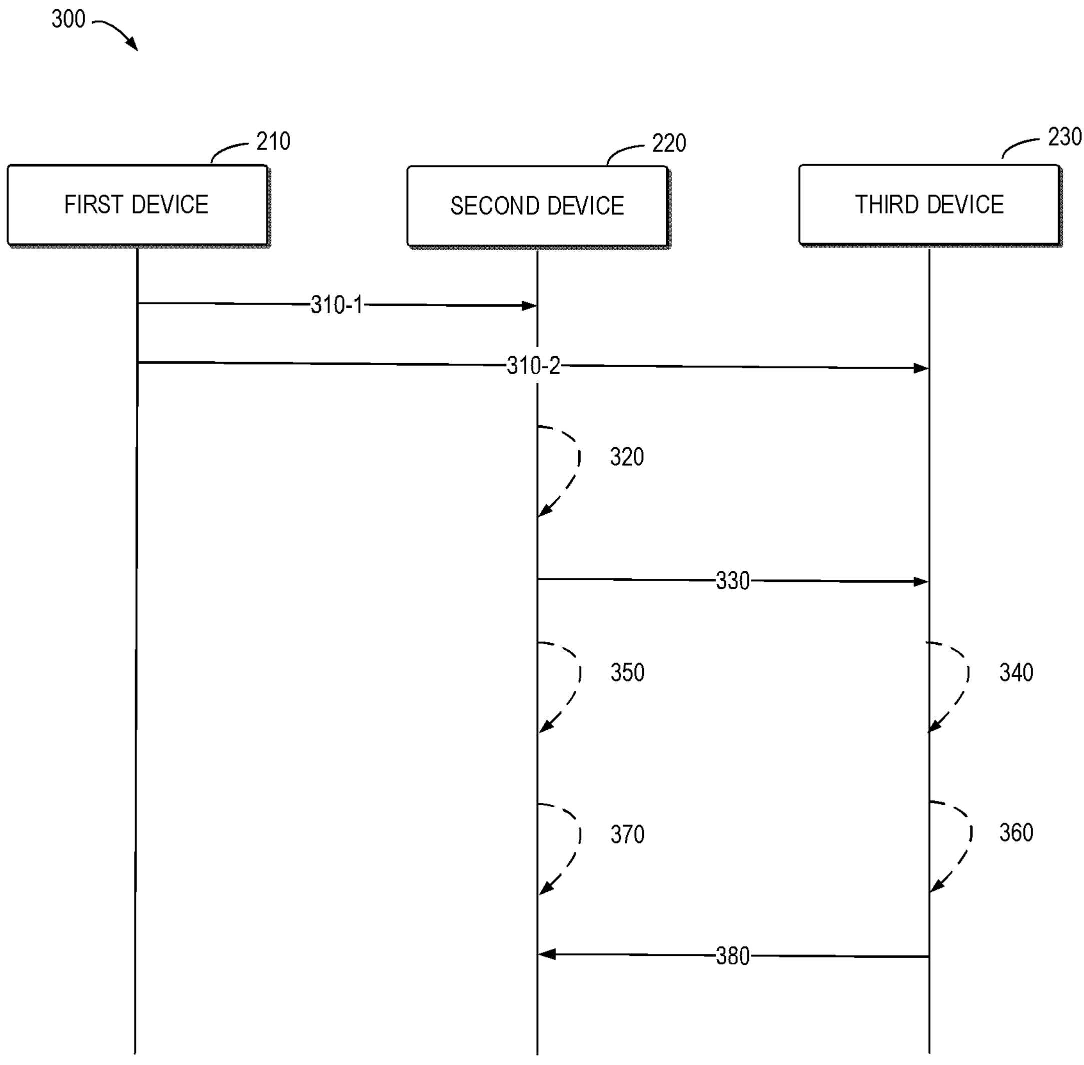
FIG. 3 illustrates an example signaling chart for the method of transmission of feedback information in accordance with some embodiments of the present disclosure.

FIG. 3 shows example signaling charts 300 for the method for the transmission of feedback information in accordance with some embodiments of the present disclosure. The method may be implemented at any suitable devices according to the specific implements. Only for the purpose of illustrations, the signaling charts 300 are described to be implemented between the first device 210, the second device 220 and the third device 230 as shown in FIG. 2. Further, the first device 210 functions as a network device, the second device 220 and the third device 230 function as terminal devices. Further, in this specific example embodiment, the second device 220, as a transmitting device, transmits the SL transmission to the third device 230 in unlicensed resource and receives the feedback information from the third device 230, while the third device 230, as a receiving device, receives the SL transmission from the second device 220 and transmits the feedback information to the second device 220.

Figure 4:
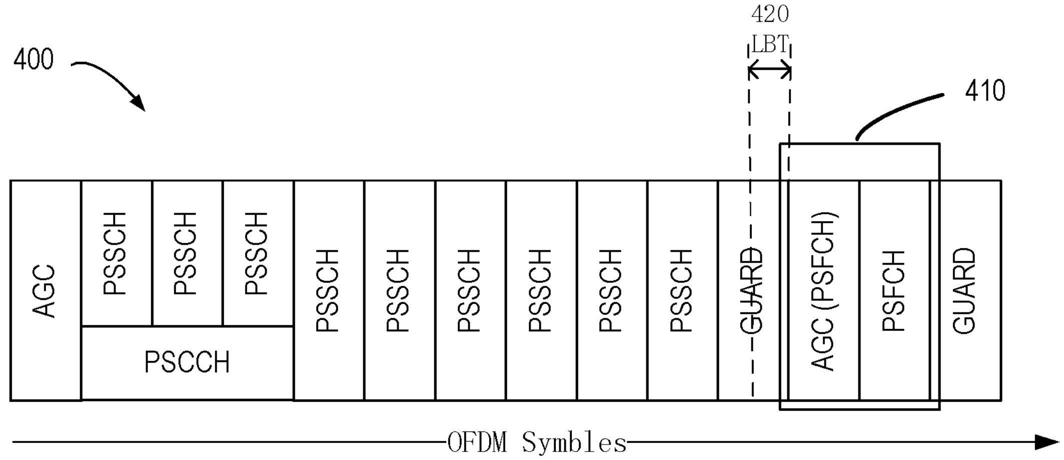
FIG. 4 illustrates an example slot format of SL channel in accordance with some embodiments of the present disclosure.
Figure 5A:
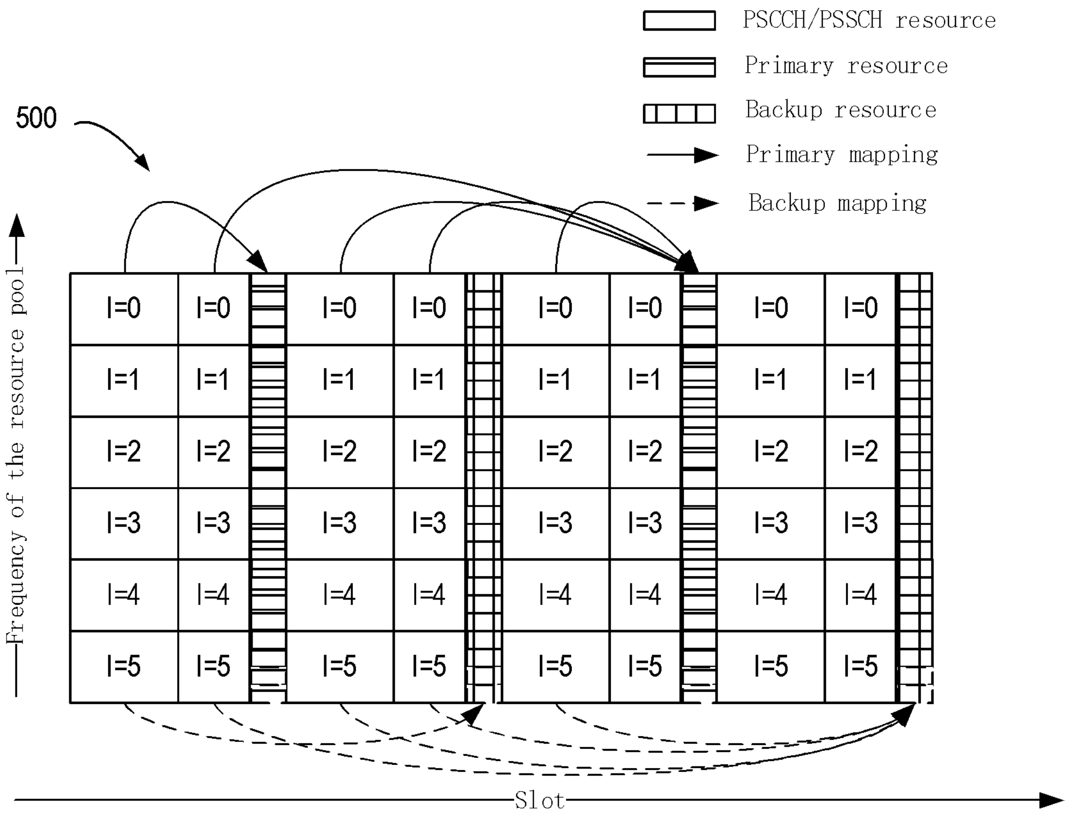
FIGS. 5A and 5B illustrate examples of the resource allocation of PSFCH in accordance with some embodiments of the present disclosure.
Figure 5B:
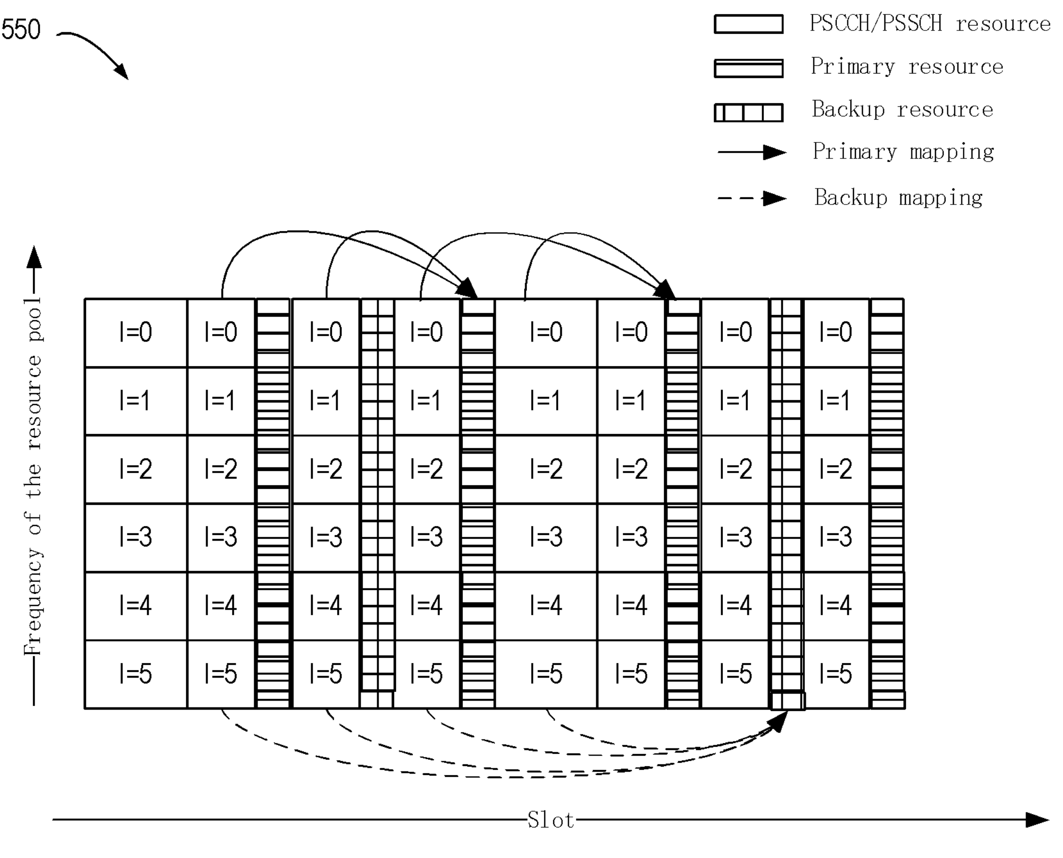

FIG. 4 illustrates an example slot format 400 of SL channel in accordance with some embodiments of the present disclosure, and FIGS. 5A and 5B illustrate examples of the resource allocation of PSFCH 500 and 550 in accordance with some embodiments of the present disclosure. It is to be understood that the examples of FIGS. 4, 5A and 5B are described only for the purpose of illustration and help those skilled in the art to understand and implement the present disclosure, without suggesting any limitation as to the scope of the disclosure. For example, the number of primary resource(s) and the backup resource(s), the locations of the primary resource(s) and the backup resource(s) are only for the purpose of illustration without suggesting any limitation. In other words, in other example embodiments, more primary resources and more backup resources may be configured, and the locations of the primary resources and the backup resources may be configured according to the specific embodiments.

Reference is now made to FIG. 3. In the specific example of FIG. 3, in order to achieve an efficient resource allocation, the first device 210 may be responsible for resource configuration in communication network 200. In operation, the first device 210 transmits 310-1 and 310-2 a configuration to the second device 220 and the third device 230. In some example embodiments, the configuration indicates a primary resource and at least one backup resource for transmitting feedback information.

In this way, a plurality of resources for transmitting feedback information are configured to the second device 220 and the third device 230. In other words, more PSFCH resources are added in resource domain (such as, a time domain and a frequency domain) to provide more transmission opportunities for feedback information (such as, HARQ feedback information). As a result, the reliably of the transmission of the feedback information is increased.

In some example embodiments, when the third device 230 needs to transmit the feedback to the second device 220, the third device 230 should try to use the primary resource first, which means that the primary resource has a higher usage priority compared with the backup resource. In some example embodiments, if the third device 230 needs to transmit the feedback information on the primary resource, the third device 230 needs to perform a channel assessment (such as, LBT procedure) first.

One example procedure for performing the channel assessment by the third device 230 is described in conjunction with FIG. 4, which illustrates an example slot format 400 of SL channel in accordance with some embodiments of the present disclosure. As shown in FIG. 4, the slot comprises 14 OFDM symbols (referred to as OFDM symbol #1~14, respectively hereafter), where the OFDM symbol #1 is used for AGC, OFDM symbols #2~10 are used by the second device 220 for transmitting SL transmission (including PSCCH and PSSCH), OFDM symbols #11 and #14 are used as guard symbols, and OFDM symbols #12 and #13 are configured to the third device 230 as primary resource 410 for transmitting feedback information (i.e., PSFCH). As illustrated in FIG. 4, the third device 230 performs 420 a channel assessment within OFDM symbol #11.

In addition, considering the limited time window for performing channel assessment, the third device 230 may perform reduced LBT procedure within a Channel Occupancy Time (COT) sharing scenario. Examples of the reduced LBT procedure comprises but are not limited to the following types of LBT defined by 3GPP standards of TS 37.213:

- Type 2A (25 μs LBT)—for SL transmissions within the initiating device acquired COT (in case the gap between two SL transmissions is ≥25 μs, as well for SL transmissions following another SL transmission); and
- Type 2B (16 μs LBT)—for SL transmission within the initiating device acquired COT (can only be used for SL transmissions following another SL with gap exactly equal to 16 μs).

In this way, the slot format used in the licensed spectrum may be reused in the unlicensed scenario and the PSFCH carrying the feedback information may be transmitted to the second device 220 due to a feasible LBT procedure.

It is to be understood that the first device 210 may configure more than one primary resource to the second device 220 and the third device 230 to increase the reliability of the transmission of the feedback information. In this event, the third device 230 may try to transmit on the primary resources orderly by respective LBT procedures.

However, the result of the channel assessment is uncertain. Therefore, the primary resource may be unavailable for the third device 230. If so, the second device 220 will not obtain the feedback information, which may cause an unnecessary re-transmission. In order to avoid the re-transmission from the second device 220, it is expected that the feedback information may be transmitted to the second device 220 without too much latency.

According to some example embodiments of the present disclosure, in addition to the primary resource, the first device 210 further configures at least one backup resource to the second device 220 and the third device 230. Further, the at least one backup resource is to be used by the third device 230 for transmitting the feedback information of the SL transmission without performing a channel assessment. Since there is no need to perform channel assessment, the feedback information may be transmitted to second device 220 timely.

Additionally, in some example embodiments, the information of the backup resource comprised in the configuration may be used as an implicit indication to enable the third device 230 to transmit the feedback information on the at least one backup resource. In this event, when the second device 220 receives the configuration indicating the backup resource, the second device 220 will continue to detect and receive the feedback information if the second device 220 fails to receive the feedback information on the primary resource. Similarly, when the third device 230 receives the configuration indicating the backup resource, the third device 230 will transmit the feedback information on the backup resource if the primary resource is unavailable or busy.

One example about how to implement a transmission in unlicensed resource without channel assessments will be discussed in the following. According to existing wireless standards (such as, ETSI EN 301 893), it is proposed that short control signaling transmission may be supported in unlicensed spectrum. The short control signaling transmission refers to a transmission used by the equipment to send management and control frames without sensing the channel for the presence of other signals. Further, there are some constraints about the use of short control signaling transmission, for example, within an observation period of 50 ms, the number of short control signaling transmissions by the equipment shall be equal to or less than 50, and the total duration of the equipment's short control signaling transmission shall be less than 2500 us within said observation period.

As for the SL transmission, the feedback information carried by the PSFCH may be represented as a Zadoff-Chu sequence, which means that the feedback information may be carried by a short control signaling. Further, since the backup resource are (pre-)configured (additionally, the use of the backup resource may be constrained by some conditions), the resource amount limitation of the short control signaling transmission could also be satisfied. As a result, the short control signalling may be used as one example signaling carrying the feedback information to be transmitted on the backup resource.

The primary resource and the at least one backup resource may be different resource in any resource domain. In some example embodiments, the primary resource occurs prior to the at least one backup resource in time domain. Reference is made to FIG. 5A and FIG. 5B, which illustrate the examples of the resource allocation 500 and 550 of PSFCH in accordance with some embodiments of the present disclosure. In the specific example of FIG. 5A, as for the feedback information for slot 1, the primary resource starts at slot 2 while the backup resource starts at slot 4. In the specific example of FIG. 5B, as for the feedback information for slots 2 and 3, the primary resource starts at slot 4 while the backup resource starts at slot 7.

For these specific examples of FIGS. 5A and 5B, according to some example embodiments of the present discourse, the next available time occasion (indicated by the backup resource) will be used as backup resource of a primary occasion (indicated by the primary resource) for feedback information of SL transmission in unlicensed band. As one example, the transmission of short control signalling is triggered if the PSFCH in the previous time occasion fails to be transmitted due to a LBT failure. The detail procedure will be discussed in the following portions of this discourse.

Alternatively, or in addition, in some example embodiments, the primary resource and at least one backup resource occupy different frequency resources.

As one example, two or more resources (including at least one primary resource and at least one backup resource) are (pre-)configured for the transmitting the feedback information (such as, HARQ feedback information). Further, different resources of the two or more resources have different frequency (such as, two sets of resources are in two unlicensed bands). In other words, the primary resource and the backup resource are FDMed. Further, the third device 230 may perform a channel assessment (such as, LBT procedure) over frequency containing the frequency range of the primary resource. If the LBT procedure on the primary resource succeeds, the third device 230 transmits the feedback information on the primary resource. Else, the third device 230 transmits the feedback information on the backup resource (for example, transmit a short control signaling comprising the feedback information).

In some example embodiments, the feedback information transmitted on the backup resource is the same with the feedback information tried to be transmitted on the primary resource. That is, the feedback information is generated for the same SL transmission.

In some example embodiments, the backup resource may be indicated by the first device 210 in any suitable manner. In one example, the backup resource may be indicated by the first device 210 by a first delay from a resource for transmitting the SL transmission to the backup resource in time domain (such as, the number of slots, OFDM symbols and the like). In another example, the backup resource may be indicated by the first device 210 by a second delay from the primary resource to the backup resource.

In some example embodiments, the primary resource is periodic resource and is configured with a first periodicity, while each of the at least one backup resource is configured with the same first periodicity. Reference is made to FIG. 5A. In the specific example of FIG. 5A, both the primary resource and the backup resource are configured with a periodicity of 4 slots.

Alternatively, or in addition, in some example embodiments, the primary resource is periodic resource and is configured with a first periodicity, while at least one backup resource is configured with a different second periodicity.

Further, as the transmission on the backup resource can be performed without channel assessment, the transmission on the backup resource may cause interference to other transmission(s) (such as, a Wi-Fi transmission) in the communication network 200. Therefore, in some example embodiments, the second periodicity is longer than the first periodicity, for example, the period of the backup resource is multiple of that of the primary resource. Reference is made to FIG. 5B. In the specific example of FIG. 5B, the primary resource is configured with a periodicity of 2 slots and the backup resource is configured with a longer periodicity of 4 slots. In this way, more chances for a SL feedback by using the primary resource are provided, and thus this reduces the usage of backup resource (i.e., short control signalling transmission). Therefore, the impacts to external coexisting communication systems in unlicensed band are reduced.

In order to further reduce the impacts to external coexisting communication systems, in some example embodiments, the transmission on the backup resource may be constrained by some conditions. Specifically, in some example embodiments, the first device 210 further indicates a first condition for determining whether the third device 230 is allowed to trigger the transmission of the feedback information on the at least one backup resource.

In some example embodiments, the first condition is associated with priority information of a SL transmission. For example, the first condition is a priority threshold of a SL transmission. In this way, the transmission of the feedback information for the traffic which has a high requirement of latency may be ensured.

Alternatively, or in addition, the first condition is associated with interference information at the third device 230. For example, the first condition is an interference threshold at the third device 230. In this way, in case that the failure to transmit the feedback information is caused by abnormal interference, the feedback information still can be transmitted to the second device 220 timely.

It should be appreciated that the above example factors (i.e., priority information of a SL transmission and interference information at the third device 230) associated with first condition are given for the purpose of illustration without suggesting any limitations. In other example embodiments, the first condition may be associated with any suitable factors. Further, the above factors and the other suitable factors may be used separately or in combination.

Additionally, in some example embodiments, the first condition may be used as an implicit indication to enable the third device 230 to transmit the feedback information on the at least one backup resource. Specifically, when the second device 220 receives the configuration comprising the first condition, the second device 220 will continue to detect and receive the feedback information if the second device 220 fails to receive the feedback information on the primary resource. Similarly, when the third device 230 receives the configuration comprising the first condition, the third device 230 will transmit the feedback information on the backup resource if the primary resource is unavailable or busy.

The above discussion is mainly about the configuration transmitted by the first device 210. In the following, the procedure about how the second device 220 and the third device 230 receive and transmit the feedback information will be discussed.

Operations for Transmitting SL Transmission and Receiving the Feedback Information According to the Configuration The second device 220 performs 320 resource selection for PSCCH/PSSCH. Specifically, when a TB (transport block) arrives from upper layer of the second device 220, the second device 220 performs initial resource selection for the PSCCH/PSSCH. Alternatively, when a re-transmission of a TB is needed, the second device 220 performs resource reselection for PSCCH/PSSCH. Alternatively, the second device 220 may receive information of resource allocation for PSCCH/PSSCH from the first device 210.

Then the second device 220 transmits 330 the SL transmission (i.e., PSCCH/PSSCH) to the third device 230 on the selected/allocated resource.

Additionally, whether to enable the third device 230 to transmit the feedback information on the at least one backup resource may be controlled by the second device 220. In some embodiments, the second device 220 transmits an indication to enable the third device 230 to transmit the feedback information on the at least one backup resource. In this event, the indication may be used as an explicit indication to enable the third device 230 to transmit the feedback information on the at least one backup resource, or may be used an explicit indication to indicate the third device 230 that the second device 220 will be monitoring the PSFCH resources on both of the primary and backup PSFCH resources. Preferably, the indication may be transmitted together with the SL transmission (such as, transmitted as SCI).

Alternatively, or in addition, the second device 220 may define or configure some conditions to constrain the transmission on the backup resource. In some example embodiments, the second device 220 transmits a second condition for determining whether the third device 230 is allowed to trigger the transmission of the feedback information on the at least one backup resource. Similar with the first condition, the second condition also may be associated with any suitable factors, such as, priority information of the SL transmission, interference information at the third device 230 and the likes. Preferably, the second condition may be transmitted together with the SL transmission (such as, transmitted as SCI).

In addition, the second condition may be used as an implicit indication to enable the third device 230 to transmit the feedback information on the at least one backup resource. Additionally, the second condition may overwrite the first condition configured by the first device 210.

After transmitting the SL transmission, the second device 220 may detect and receive 380 the feedback information from the third device 230 according to the configuration to determine whether to trigger a re-transmission. In some example embodiments, the second device 220 determines 350 the location of the primary resource and detect the feedback information on the primary resource. In case that the second device 220 fails to detect the feedback information on the primary resource, the second device 220 determines 370 the location of the backup resource and detect the feedback information on the backup resource.

In some example embodiments, the second device 220 receives a short control signalling comprising the feedback information on the at least one backup resource from the third device 230.

The second device 220 may perform subsequent procedure based on the received feedback information. In some example embodiments, if the second device 220 receives positive feedback information (such as, ACK), the second device 220 may determine that the current TB transmission has been completed. When a new TB arrives from the upper layer, the second device 220 will perform resource selection for PSCCH/PSSCH and proceed with transmitting the TB as discussed above.

Alternatively, if the second device 220 receives negative information (such as, NACK), the second device 220 will perform resource selection for PSCCH/PSSCH and proceed with a re-transmission of the TB.

Operations for Receiving SL Transmission and Transmitting the Feedback Information According to the Configuration The operations at the third device 230 are corresponding to the operations at the second device 220 as discussed below.

The third device 230 receives 330 the SL transmission (i.e., PSCCH/PSSCH) from the second device 220. For example, the third device 230 keeps decoding PSCCHs (control channels) in SL Rx pool. If the PSSCH (data channel) corresponding to a decoded PSCCH is of interest to the third device 230, the third device 230 decodes the PSSCH.

Further, based on the result of decoding, the third device 230 determines whether the SL transmission has been received correctly. Then the third device 230 transmits the feedback information to the second device 220 based on the configuration.

In some example embodiments, the third device 230 determines 340 the location of the primary resource and then further determines the state of the primary resource. If the third device 230 determines 340 that the state of the primary resource is idle, the third device 230 transmits 380 the feedback information on the primary resource. Alternatively, if the third device 230 determines that the state of the primary resource is not idle, the third device 230 determines 360 the location of the backup resource and transmits 380 the feedback information on the backup resource.

Additional, the third device 230 may obtain the state of the primary resource by performing a channel assessment (such as, a LBT procedure). Specifically, in some example embodiments, the third device 230 performs a channel assessment with regard to the primary resource, and determines the state of the primary resource based on the result of the channel assessment. In some example embodiments, the third device 230 performs LBT using the guard symbol before the PSFCH resource. Reference is made to FIG. 4, the third device 230 performs LBT within the guard symbol (i.e., OFDM symbol #11) before the PSFCH resource.

Additionally, in some example embodiments, the transmission on the backup resource is constrained. In one example, the third device 230 transmits the feedback information on the backup resource if the third device 230 receives an indication to enable the third device 230 to transmit the feedback information on the at least one backup resource from the second device 220. Else, the transmission on the backup information is disabled.

In another example, the third device 230 transmits the feedback information if a first condition for determining whether the third device 230 is allowed to trigger the transmission of the feedback information on the at least one backup resource is met. In a further example, the third device 230 transmits the feedback information if the second condition for determining whether the third device 230 is allowed to trigger the transmission of the feedback information on the at least one backup resource is met.

In some example embodiments, the first condition or the second condition is associated with priority information of a SL transmission. For example, the first condition or the second condition is a priority threshold. For this specific example, when the third device 230 determines that the primary resource is unavailable, the third device 230 will further determine whether the priority of the SL transmission is above the priority threshold. The third device 230 proceeds with transmitting the feedback information on the backup resource if the priority of the SL transmission is above the priority threshold. Else, the transmission on the backup information is disabled.

Alternatively, or in addition, in some example embodiments, the first condition or the second condition is associated with interference information at the third device 230. For example, the first condition or the second condition is an interference threshold at the third device 230. For this specific example, when the third device 230 determines that the primary resource is unavailable, the third device 230 will further determine whether the value of the interference (such as, a received signal strength indicator (RSSI)) at the third device 230 is above the interference threshold. The third device 230 proceeds with transmitting the feedback information on the backup resource if the value of the interference is above the interference threshold. Else, the transmission on the backup information is disabled.

In some example embodiments, the third device 230 transmits a short control signalling comprising the feedback information on the at least one backup resource to the second device 220.

One Specific Example with Reference to FIG. 5A

One example procedure is described for the purpose of illustration. The primary resource indicates a set of primary transmission resources, and each of the primary transmission resource is corresponding to a time location, a frequency location and an additional resource (e.g. cyclic shift). Similarly, each of the backup resource also indicates a set of backup transmission resources, and each of the backup transmission resource is corresponding to a time location, a frequency location and an additional resource (e.g. cyclic shift). Further, each primary transmission resource has a corresponding backup transmission resource.

Reference is made to FIG. 5A. In the specific example of FIG. 5A, the primary resource indicates a set of primary transmission resources (i.e., in slot 2 and slot 6), while the back resource indicates a set of backup transmission resources (i.e., in slot 4 and slot 8). Further, both the primary transmission resource in slot 2 and the backup transmission resource in slot 4 are used for the feedback information for the same SL transmission (i.e., SL transmission in slot 1). Similarly, both the primary transmission resource in slot 6 and the backup transmission resource in slot 8 are used for the feedback information for the same SL transmission (i.e., SL transmission in slots 2~5).

When receiving the feedback information, the second device 220 detects the feedback on each primary transmission resource, and if the second device 220 fails to detect the feedback information on one primary transmission resource, the second device 220 will continue to detect the feedback information on the backup transmission resource corresponding to the primary transmission resource (i.e., the next available PSFCH resource). In the specific example of FIG. 5A, the second device 220 first detects the feedback information in slot 2. If the second device 220 fails to detect the feedback information in slot 2, the second device 220 will detect the feedback information in slot 4 to obtain the feedback information. As both the primary transmission resource in slot 2 and the backup transmission resource in slot 4 are used for the feedback information for the SL transmission in slot 1, the reliability of the transmission of the feedback information is increased. Similarly, if the second device 220 fails to detect the feedback information in slot 6, the second device 220 will detect the feedback information in slot 8 to obtain the feedback information.

Similarly, when transmitting the feedback information, the third device 230 first determines whether the respective primary transmission resource is available, and if the third device 230 determines that the primary transmission resource is available, the third device 230 will transmit the feedback information on the primary transmission resource. Else, the third device 230 will transmit the feedback information on the backup transmission resource corresponding to the primary transmission resource.

In the specific example of FIG. 5A, the third device 230 determines whether the primary transmission resource in slot 2 is available (for example, by a LBT procedure). If the third device 230 determines that the primary transmission resource in slot 2 is unavailable, the third device 230 will transmit the feedback information in the backup transmission resource in slot 4 directly (without performing a channel assessment), such as, by transmitting a short control signalling comprising the feedback information on the backup transmission resource in slot 4. Similarly, if the third device 230 determines that the primary transmission resource in slot 6 is unavailable, the third device 230 will transmit the feedback information (for the SL transmission in slots 2~5) in the backup transmission resource in slot 8 directly.

Another Specific Example with Reference to FIG. 5B

Reference is made to FIG. 5B. In the specific example, the primary resource indicates a set of primary transmission resources (i.e., in slots 2, 4, 6 and 8), while the backup resource indicates a set of backup transmission resources (i.e., in slot 3 and slot 7). Further, the feedback information for the SL transmission in slots 2 and 3 may be transmitted on the primary transmission resource in slot 4 and the backup transmission resource in slot 7. Similarly, the feedback information for the SL transmission in slot 4 and 5 may be transmitted on the primary transmission resource in slot 6 and the backup transmission resource in slot 7.

When receiving the feedback information, the second device 220 detects the feedback on each primary transmission resource, and if the second device 220 fails to detect the feedback information on the primary transmission resource, the second device 220 will continue to detect the feedback information on the backup transmission resource corresponding to the primary transmission resource. In the specific example of FIG. 5B, the second device 220 first detects the feedback information in slot 4 (i.e., one primary transmission resource). If the second device 220 fails to detect the feedback information in slot 4, the second device 220 will detect the feedback information in slot 7 to obtain the feedback information. Similarly, if the second device 220 fails to detect the feedback information in slot 6, the second device 220 will detect the feedback information in slot 7 to obtain the feedback information.

Similarly, when transmitting the feedback information, the third device 230 first determines whether the respective primary transmission resource is available, and if the third device 230 determines that the primary transmission resource is available, the third device 230 will transmit the feedback information on the primary transmission resource. Else, the third device 230 will transmit the feedback information on the backup transmission resource corresponding to the primary transmission resource.

In the specific example of FIG. 5B, the third device 230 determines whether the primary transmission resource in slot 4 is available (for example, by a LBT procedure). If the third device 230 determines that the primary transmission resource in slot 4 is unavailable, the third device 230 will transmit the feedback information in the backup transmission resource in slot 7 directly (without performing a channel assessment), such as, by transmitting a short control signalling comprising the feedback information on the backup transmission resource in slot 7.

Similarly, if the third device 230 determines that the primary transmission resource in slots 6 is unavailable, the third device 230 will transmit the feedback information (for the SL transmission in slots 4 and 5) in the backup transmission resource in slot 7 directly.

Figure 6:
FIG. 6 illustrates an example flowchart of a method implemented at a first device according to some example embodiments of the present disclosure.

FIG. 6 shows a flowchart of an example method 600 implemented at a first device 210 in accordance with some example embodiments of the present disclosure. For the purpose of discussion, the method 600 will be described from the perspective of the first device 210 with respect to FIG. 2. It is to be understood that the method 600 may include additional blocks not shown and/or may omit some shown blocks, and the scope of the present disclosure is not limited in this regard.

At block 610, the first device 210 transmits to a second device 220 and a third device 230, a configuration indicating: a primary resource to be used by the third device 230 for transmitting feedback information of a SL transmission to the second device 220, the SL transmission being transmitted by the second device 220 on an unlicensed resource, and at least one backup resource to be used by the third device 230 for transmitting the feedback information of the SL transmission without performing a channel assessment.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the at least one backup resource is configured to be used by the third device 230 for transmitting the feedback information of the SL transmission via a short control signalling.

In some example embodiments, the configuration further indicates: a first condition for determining whether the third device 230 is allowed to trigger the transmission of the feedback information on the at least one backup resource.

In some example embodiments, the first condition is associated with at least one of the following: priority information of a SL transmission, or interference information at the third device 230.

In some example embodiments, the first device 210 is a network device, and the second device 220 and third device 230 are terminal devices.

Figure 7:
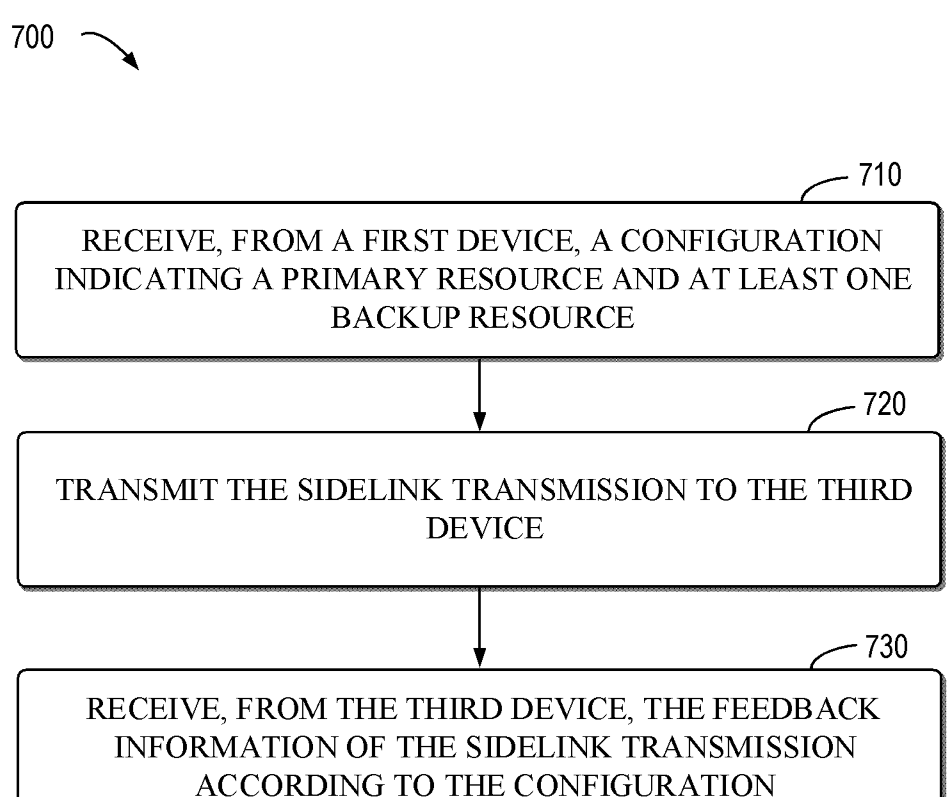
FIG. 7 illustrates an example flowchart of a method implemented at a second device according to some example embodiments of the present disclosure.

FIG. 7 shows a flowchart of an example method 700 implemented at a second device 220 in accordance with some example embodiments of the present disclosure. For the purpose of discussion, the method 700 will be described from the perspective of the second device 220 with respect to FIG. 2. It is to be understood that the method 700 may include additional blocks not shown and/or may omit some shown blocks, and the scope of the present disclosure is not limited in this regard.

At block 710, the second device 220 receives from a first device 210, a configuration indicating: a primary resource to be used by a third device 230 for transmitting feedback information of a SL transmission to the second device 220, the SL transmission being transmitted by the second device 220 on an unlicensed resource, and at least one backup resource to be used by the third device 230 for transmitting the feedback information of the SL transmission without performing a channel assessment.

At block 720, the second device 220 transmits the SL transmission to the third device 230.

At block 730, the second device 220 receives, from the third device 230, the feedback information of the SL transmission according to the configuration.

In some example embodiments, the second device 220 receives, from the third device 230 and on the at least one backup resource, the feedback information in response to a failure to detect the feedback information on the primary resource.

In some example embodiments, the second device 220 receives, from the third device 230 and on the at least one backup resource, a short control signalling comprising the feedback information.

In some example embodiments, the second device 220 transmits, to the third device 230, at least one the following: an indication to enable the third device 230 to transmit the feedback information on the at least one backup resource, or a second condition for determining whether the third device 230 is allowed to trigger the transmission of the feedback information on the at least one backup resource.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the configuration further indicates: a first condition for determining whether the third device 230 is allowed to trigger the transmission of the feedback information on the at least one backup resource.

In some example embodiments, the first condition is associated with at least one of the following: priority information of a SL transmission, or interference information at the third device 230.

In some example embodiments, the first device 210 is a network device, and the second device 220 and third device 230 are terminal devices.

Figure 8:
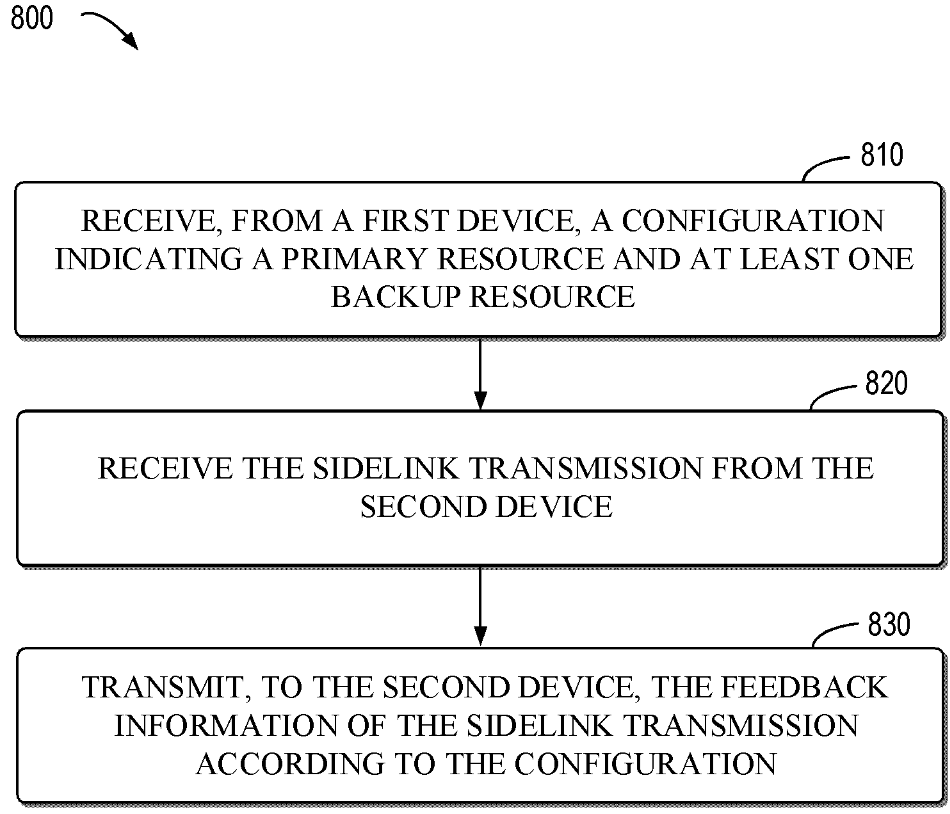
FIG. 8 illustrates an example flowchart of a method implemented at a third device according to some example embodiments of the present disclosure.

FIG. 8 shows a flowchart of an example method 800 implemented at a third device 230 in accordance with some example embodiments of the present disclosure. For the purpose of discussion, the method 800 will be described from the perspective of the third device 230 with respect to FIG. 2. It is to be understood that the method 800 may include additional blocks not shown and/or may omit some shown blocks, and the scope of the present disclosure is not limited in this regard.

At block 810, the third device 230 receives, from a first device 210, a configuration indicating: a primary resource to be used by a third device 230 for transmitting feedback information of a SL transmission to the second device 220, the SL transmission being transmitted by the second device 220 on an unlicensed resource, and at least one backup resource to be used by the third device 230 for transmitting the feedback information of the SL transmission without performing a channel assessment.

At block 820, the third device 230 receives the SL transmission from the second device 220.

At block 830, the third device 230 transmits, to the second device 220, the feedback information of the SL transmission according to the configuration.

In some example embodiments, the third device 230 transmits the feedback information on the primary resource in accordance with a determination that a state of the primary resource is idle; and the third device 230 transmits the feedback information on the at least one backup resource in accordance with a determination that the state of the primary resource is not idle.

In some example embodiments, the third device 230 performs a channel assessment with regard to the primary resource and determines the state of the primary resource based on the result of the channel assessment.

In some example embodiments, the third device 230 transmits the feedback information of the SL transmission on the at least one backup resource if a first condition for determining whether the third device 230 is allowed to trigger the transmission of the feedback information on the at least one backup resource is met, the first condition being indicated in the configuration by the first device 210.

In some example embodiments, the third device 230 transmits the feedback information of the SL transmission on the at least one backup resource if the third device 230 receives, from the second device 220, an indication to enable the third device 230 to transmit the feedback information on the at least one backup resource.

In some example embodiments, the third device 230 transmits the feedback information of the SL transmission on the at least one backup resource if a second condition for determining whether the third device 230 is allowed to trigger the transmission of the feedback information on the at least one backup resource is met, the second condition being transmitted by the second device 220.

In some example embodiments, the first condition is associated with at least one of the following: priority information of a SL transmission, or interference information at the third device 230.

In some example embodiments, the third device 230 transmits, to the second device 220 and on the at least one backup resource, a short control signalling comprising the feedback information.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the first device 210 is a network device, and the second device 220 and third device 230 are terminal devices.

In some example embodiments, a first apparatus capable of performing any of the method 600 (for example, the first device 210) may comprise means for performing the respective operations of the method 600. The means may be implemented in any suitable form. For example, the means may be implemented in a circuitry or software module. The first apparatus may be implemented as or included in the first device 210.

In some example embodiments, the first apparatus comprises means for transmitting, to a second apparatus and a third apparatus, a configuration indicating: a primary resource to be used by a third apparatus for transmitting feedback information of a SL transmission to the second apparatus, the SL transmission being transmitted by the second apparatus on an unlicensed resource, and at least one backup resource to be used by the third apparatus for transmitting the feedback information of the SL transmission without performing a channel assessment.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the at least one backup resource is configured to be used by the third apparatus for transmitting the feedback information of the SL transmission via a short control signalling.

In some example embodiments, the configuration further indicates: a first condition for determining whether the third apparatus is allowed to trigger the transmission of the feedback information on the at least one backup resource.

In some example embodiments, the first condition is associated with at least one of the following: priority information of a SL transmission, or interference information at the third apparatus.

In some example embodiments, the first apparatus is a network apparatus, and the second and third apparatuses are terminal apparatuses.

In some example embodiments, a second apparatus capable of performing any of the method 700 (for example, the second device 220) may comprise means for performing the respective operations of the method 700. The means may be implemented in any suitable form. For example, the means may be implemented in a circuitry or software module. The second apparatus may be implemented as or included in the second device 220.

In some example embodiments, the second apparatus comprises means for receiving, from a first apparatus, a configuration indicating: a primary resource to be used by a third apparatus for transmitting feedback information of a SL transmission to the second apparatus, the SL transmission being transmitted by the second apparatus on an unlicensed resource, and at least one backup resource to be used by the third apparatus for transmitting the feedback information of the SL transmission without performing a channel assessment. The second apparatus further comprises means for transmitting the SL transmission to the third apparatus. The second apparatus also comprises means for receiving, from the third apparatus, the feedback information of the SL transmission according to the configuration.

In some example embodiments, means for receiving the feedback information comprises: means for receiving, from the third apparatus and on the at least one backup resource, a short control signalling comprising the feedback information.

In some example embodiments, the first apparatus further comprises means for transmitting, to the third apparatus, at least one the following: an indication to enable the third apparatus to transmit the feedback information on the at least one backup resource, or a second condition for determining whether the third apparatus is allowed to trigger the transmission of the feedback information on the at least one backup resource.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the configuration further indicates: a first condition for determining whether the third apparatus is allowed to trigger the transmission of the feedback information on the at least one backup resource.

In some example embodiments, the first condition is associated with at least one of the following: priority information of a SL transmission, or interference information at the third apparatus.

In some example embodiments, the first apparatus is a network apparatus, and the second and third apparatuses are terminal apparatuses.

In some example embodiments, a third apparatus capable of performing any of the method 800 (for example, the third device 230) may comprise means for performing the respective operations of the method 800. The means may be implemented in any suitable form. For example, the means may be implemented in a circuitry or software module. The third apparatus may be implemented as or included in the third device 230.

In some example embodiments, the third apparatus comprises means for receiving, from a first apparatus, a configuration indicating: a primary resource to be used by the third apparatus for transmitting feedback information of a SL transmission to the second apparatus, the SL transmission being transmitted by the second apparatus on un unlicensed resource, and at least one backup resource to be used by the third apparatus for transmitting the feedback information of the SL transmission without performing a channel assessment. The third apparatus further comprises means for receiving the SL transmission from the second apparatus. The third apparatus also comprises means for transmitting, to the second apparatus, the feedback information of the SL transmission according to the configuration.

In some example embodiments, means for transmitting the feedback information comprises: means for in accordance with a determination that a state of the primary resource is idle, transmitting the feedback information on the primary resource; and means for in accordance with a determination that the state of the primary resource is not idle, transmitting the feedback information on the at least one backup resource.

In some example embodiments, the third apparatus further comprises means for performing a channel assessment with regard to the primary resource and means for determining the state of the primary resource based on the result of the channel assessment.

In some example embodiments, means for transmitting the feedback information on the at least one backup resource comprises: means for transmitting the feedback information of the SL transmission on the at least one backup resource if a first condition for determining whether the third apparatus is allowed to trigger the transmission of the feedback information on the at least one backup resource is met, the first condition being indicated in the configuration by the first apparatus.

In some example embodiments, means for transmitting the feedback information on the at least one backup resource comprises: means for transmitting the feedback information of the SL transmission on the at least one backup resource if the third apparatus receives, from the second apparatus, an indication to enable the third apparatus to transmit the feedback information on the at least one backup resource.

In some example embodiments, means for transmitting the feedback information on the at least one backup resource comprises: means for transmitting the feedback information of the SL transmission on the at least one backup resource if a second condition for determining whether the third apparatus is allowed to trigger the transmission of the feedback information on the at least one backup resource is met, the second condition being transmitted by the second apparatus.

In some example embodiments, the first condition is associated with at least one of the following: priority information of a SL transmission, or interference information at the third apparatus.

In some example embodiments, means for transmitting the feedback information comprises: means for transmitting, to the second apparatus and on the at least one backup resource, a short control signalling comprising the feedback information.

In some example embodiments, the primary resource occurs prior to the at least one backup resource in time domain.

In some example embodiments, the primary resource and at least one backup resource occupy different frequency resources.

In some example embodiments, a backup resource of the at least one backup resource is indicated by at least one of the following: a first delay from a resource for transmitting the SL transmission to the backup resource in time domain, or a second delay from the primary resource to the backup resource.

In some example embodiments, the primary resource is configured with a first periodicity, and each of the at least one backup resource is configured with the same first periodicity or at least one backup resource is configured with a different second periodicity.

In some example embodiments, the first apparatus is a network apparatus, and the second and third apparatuses are terminal apparatuses.

Figure 9:
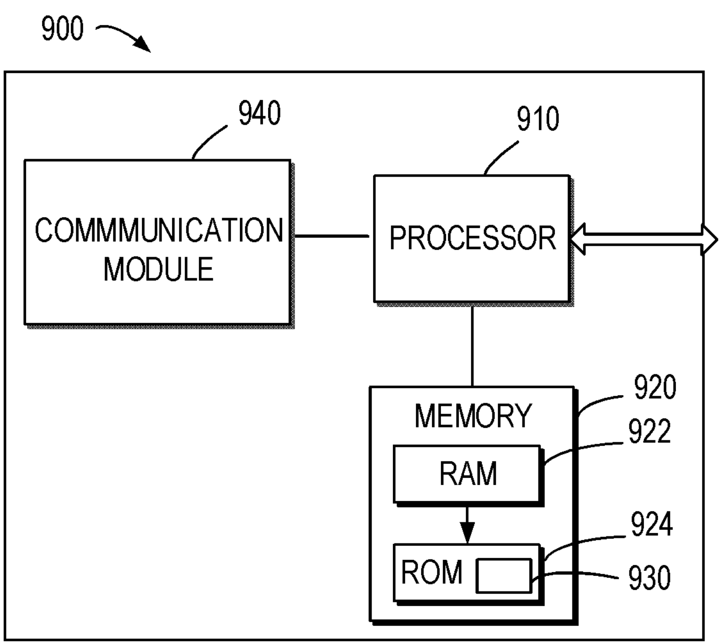
FIG. 9 illustrates a simplified block diagram of an apparatus that is suitable for implementing example embodiments of the present disclosure.

FIG. 9 is a simplified block diagram of a device 900 that is suitable for implementing example embodiments of the present disclosure. The device 900 may be provided to implement the communication device, for example the first device 210, the second device 220 or the third device 230 as shown in FIG. 2. As shown, the device 900 includes one or more processors 910, one or more memories 940 coupled to the processor 910, and one or more transmitters and/or receivers (TX/RX) 940 coupled to the processor 910.

The TX/RX 940 is for bidirectional communications. The TX/RX 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 1020. The processor 910 may perform any suitable actions and processing by loading the program 930 into the RAM 920.

The example embodiments of the present disclosure may be implemented by means of the program 930 so that the device 900 may perform any process of the disclosure as discussed with reference to FIGS. 3 to 8. The example embodiments of the present disclosure may also be implemented by hardware or by a combination of software and hardware.

Figure 10:
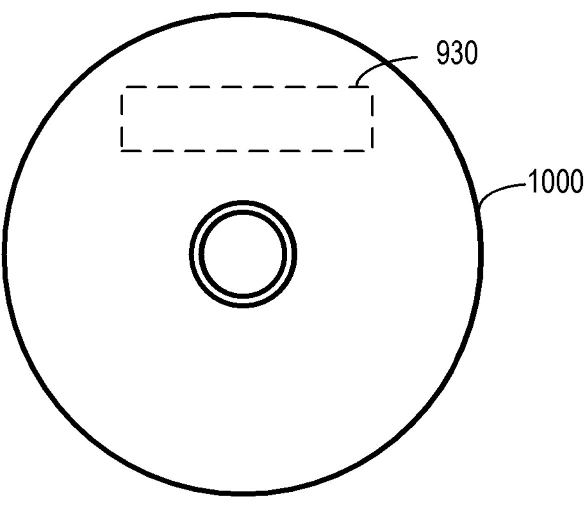
FIG. 10 illustrates a schematic diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 600-800 as described above with reference to FIGS. 6-8. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device being a New Radio (NR) base station, the first device comprising:

at least one processor; and at least one memory including computer program code;

wherein the at least one memory and the computer program code are configured to, with the at least one processor, cause the first device to:

transmit, to a second device and a third device, each of the second device and the third device being a user equipment (UE), a configuration indicating:

a primary resource on a Physical Sidelink Feedback Channel (PSFCH), for a third device to transmit Hybrid Automatic Repeat Request (HARQ) feedback information of a sidelink transmission to the second device, wherein the sidelink transmission is transmitted by the second device to the third device on an unlicensed resource, and wherein the configuration conditions transmission on the primary resource upon a successful Listen-Before-Talk (LBT) procedure performed by the third device within a guard period adjacent to and preceding the primary resource in a time domain;

at least one backup resource for transmitting, by the third device, the HARQ feedback information of the sidelink transmission via a short control signalling transmission without performing a channel assessment, wherein the configuration defines the primary resource with a first periodicity and defines the at least one backup resource with a second periodicity that is longer than the first periodicity, wherein the primary resource occurs prior to the at least one backup resource in the time domain, and wherein the configuration further defines a location of the at least one backup resource in the time domain by a configured delay from the primary resource; and a first condition enabling transmission of the HARQ feedback information on the at least one backup resource, wherein the first condition defines a priority threshold, and wherein the first condition permits transmission on the at least one backup resource only when a priority of the sidelink transmission exceeds the priority threshold.

2. The first device of claim 1, wherein the configuration further defines that the primary resource and the at least one backup resource occupy different frequency resources.

3. The first device of claim 1, wherein the configuration further indicates a location of the at least one backup resource in the time domain by defining a configured delay from a resource for transmitting the sidelink transmission.

4. The first device of claim 1, wherein the first condition is further associated with interference information at the third device, and wherein transmission on the at least one backup resource is further enabled when an interference level at the third device exceeds an interference threshold.

5. A second device, the second device being a user equipment (UE), comprising:

at least one processor; and at least one memory including computer program code;

wherein the at least one memory and the computer program code are configured to, with the at least one processor, cause the second device to:

receive, from a first device being a New Radio (NR) base station, a configuration indicating:

a primary resource on a Physical Sidelink Feedback Channel (PSFCH) for a third device to transmit Hybrid Automatic Repeat Request (HARQ) feedback information for a sidelink transmission from the second device, the third device being a UE different from the second device, wherein the sidelink transmission is transmitted by the second device to the third device on an unlicensed resource, and wherein configuration conditions transmission on the primary resource upon a successful Listen-Before-Talk (LBT) procedure performed by the third device within a guard period adjacent to and preceding the primary resource in a time domain;

at least one backup resource for transmitting, by the third device, the HARQ feedback information of the sidelink transmission via a short control signalling transmission without performing a channel assessment, wherein the configuration defines the primary resource with a first periodicity and defines the at least one backup resource with a second periodicity that is longer than the first periodicity, wherein the primary resource occurs prior to the at least one backup resource in the time domain, and wherein the configuration further defines a location of the at least one backup resource in the time domain by a configured delay from the primary resource; and a first condition enabling transmission of the HARQ feedback information on the at least one backup resource, wherein the first condition defines a priority threshold, and wherein the first condition permits transmission on the at least one backup resource only when a priority of the sidelink transmission exceeds the priority threshold;

select a transmission resource on the unlicensed resource for the sidelink transmission;

transmit, on the selected transmission resource, the sidelink transmission to the third device, wherein the transmission of the sidelink transmission further comprises transmitting, to the third device, at least one of:

an indication to enable the third device to transmit the HARQ feedback information on the at least one backup resource, or a second condition for determining whether the third device is allowed to trigger the transmission of the HARQ feedback information on the at least one backup resource;

determine a location of the primary resource based on the configuration and monitor the primary resource to detect the HARQ feedback information from the third device; and in response to a failure to detect the HARQ feedback information on the primary resource, receive, from the third device, the HARQ feedback information of the sidelink transmission on the at least one backup resource.

6. The second device of claim 5, wherein the primary resource and the at least one backup resource occupy different frequency resources.

7. The second device of claim 5, wherein the configuration indicates a location of the at least one backup resource in the time domain by defining a configured delay from a resource for transmitting the sidelink transmission.

8. A third device configured as a user equipment (UE), comprising:

at least one processor; and at least one memory including computer program code;

wherein the at least one memory and the computer program code are configured to, with the at least one processor, cause the third device to:

receive, from a first device, the first device being a New Radio (NR) base station, a configuration indicating:

a primary resource on a Physical Sidelink Feedback Channel (PSFCH) for a third device to transmit Hybrid Automatic Repeat Request (HARQ) feedback information of a sidelink transmission to a second device, the second device being a UE different from the third device, wherein the sidelink transmission is transmitted by the second device to the third device on an unlicensed resource, and wherein the configuration conditions transmission on the primary resource upon a successful Listen-Before-Talk (LBT) procedure performed by the third device within a guard period adjacent to and preceding the primary resource in a time domain;

at least one backup resource for transmitting, by the third device, the HARQ feedback information of the sidelink transmission via a short control signalling transmission without performing a channel assessment, wherein the configuration defines the primary resource with a first periodicity and defines the at least one backup resource with a second periodicity that is longer than the first periodicity, wherein the primary resource occurs prior to the at least one backup resource in the time domain, and wherein the configuration further defines a location of the at least one backup resource in the time domain by a configured delay from the primary resource; and a first condition enabling transmission of the HARQ feedback information on the at least one backup resource, wherein the first condition defines a priority threshold, and wherein the first condition permits transmission on the at least one backup resource only when a priority of the sidelink transmission exceeds the priority threshold;

receive the sidelink transmission from the second device; determine, based on the configuration, a location of the primary resource;

determine a state of the primary resource by performing the LBT procedure at the determined location of the primary resource within the guard period;

in response to a determination that the state of the primary resource is idle, transmit the HARQ feedback information to the second device on the primary resource; and in response to a determination that the state of the primary resource is not idle:

determine, based on the configuration, a location of the at least one backup resource; and in response to a determination that a priority of the received sidelink transmission exceeds the priority threshold defined by the first condition, transmit, to the second device, the HARQ feedback information of the sidelink transmission on the at least one backup resource at the determined location of the at least one backup resource via the short control signalling transmission.

9. The third device of claim 8, wherein the at least one memory and the computer program code are configured to, with the at least one processor, further cause the third device to receive, from the second device, an indication to enable the third device to transmit the HARQ feedback information on the at least one backup resource.

10. The third device of claim 9, wherein the first condition is further associated with interference information at the third device, and wherein transmission on the at least one backup resource is enabled when an interference level at the third device exceeds an interference threshold.

11. The third device of claim 10, wherein the location of the at least one backup resource is alternatively indicated by a configured delay from a resource for transmitting the sidelink transmission.

12. The third device of claim 11, wherein the guard period comprises at least one Orthogonal Frequency Division Multiplexing (OFDM) symbol immediately preceding the primary resource in the time domain, and wherein the LBT procedure is performed entirely within the at least one OFDM symbol.

13. The third device of claim 12, wherein the LBT procedure comprises a Type 2A or Type 2B Listen-Before-Talk procedure performed within a Channel Occupancy Time (COT) acquired by an initiating device.

14. The third device of claim 13, wherein the short control signalling transmission on the at least one backup resource carries the HARQ feedback information using a Zadoff-Chu sequence mapped to a single Physical Resource Block (PRB) over two OFDM symbols.

15. The third device of claim 14, wherein the configuration defines a plurality of primary resources and a corresponding plurality of backup resources, each primary resource being associated with a respective backup resource for transmission of HARQ feedback information corresponding to a same sidelink transmission.

16. The third device of claim 15, wherein the third device is further caused to attempt transmission on the plurality of primary resources sequentially based on respective LBT procedures prior to transmitting on the associated backup resource.

17. The third device of claim 16, wherein the primary resource and the at least one backup resource occupy different frequency resources, and wherein the primary resource and the at least one backup resource are frequency-division multiplexed.

18. The third device of claim 17, wherein the configured delay defining the location of the at least one backup resource comprises a number of slots offset from the primary resource.

19. The third device of claim 18, wherein the short control signalling transmission on the at least one backup resource is constrained such that, within an observation period of 50 milliseconds, a number of short control signalling transmissions does not exceed 50 and a cumulative transmission duration does not exceed 2500 microseconds.

20. The third device of claim 16, wherein the HARQ feedback information transmitted on the at least one backup resource is identical to HARQ feedback information attempted to be transmitted on the primary resource and corresponds to a same transport block of the sidelink transmission.

* * * * *